Oct. 17, 1950  N. B. FARISH, JR ET AL  2,525,879
QUICK-DETACHABLE FLUID LINE CONNECTOR

Filed Sept. 21, 1948  2 Sheets-Sheet 1

INVENTOR.
NED B FARISH, JR,
JAMES O. COX, JR.
BY
McMorrow, Berman + Davidson
ATTORNEYS.

Oct. 17, 1950  N. B. FARISH, JR ET AL  2,525,879
QUICK-DETACHABLE FLUID LINE CONNECTOR
Filed Sept. 21, 1948  2 Sheets—Sheet 2
FIG. 6.
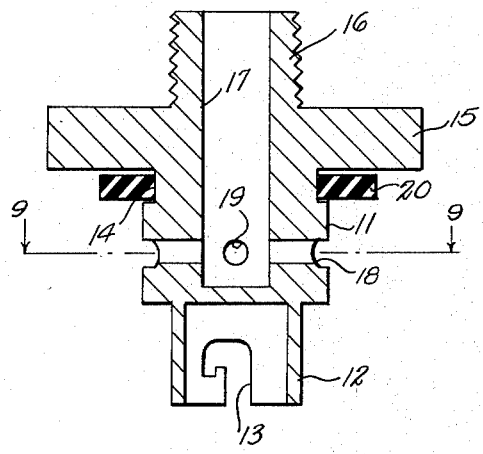
FIG. 8.
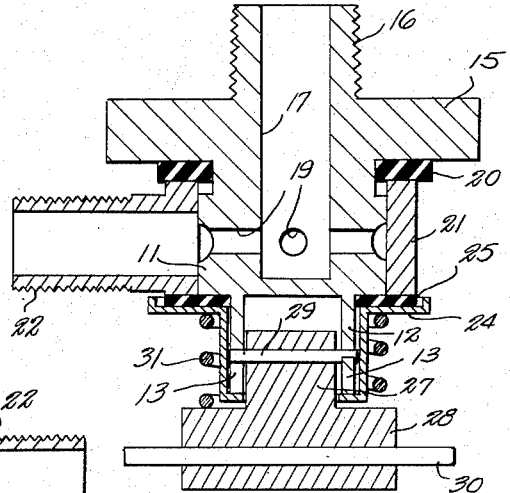
FIG. 7.
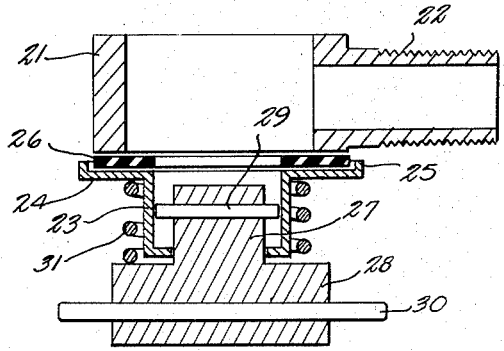
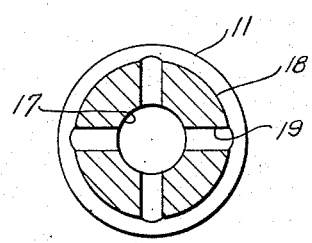
FIG. 9.
INVENTOR.
NED B. FARISH, JR.
JAMES O. COX, JR.
BY
McMorrow, Berman + Davidson
ATTORNEYS.

Patented Oct. 17, 1950

2,525,879

UNITED STATES PATENT OFFICE 2,525,879

QUICK-DETACHABLE FLUID LINE CONNECTOR

Ned B. Farish, Jr., and James O. Cox, Jr., Brandon, Miss.

Application September 21, 1948, Serial No. 50,382

4 Claims. (Cl. 285—97.3)

This invention relates to fluid line connectors, and more particularly to connectors for use on fluid-carrying lines which must be often disconnected and replaced, such as for use on gasoline or oil lines which must be drained.

A main object of the invention is to provide a novel and improved quick-connectable and quick-detachable connector unit for use on fluid-carrying lines which must be frequently disconnected and re-connected, said unit being very simple in construction, easy to manipulate, and providing a thoroughly fluid-tight joint.

A further object of the invention is to provide an improved detachable connector unit for use on fluid lines, such as the gasoline lines of outboard motors and the like which must be drained of gasoline at the end of use, the connector unit being very easy to take apart, so that the task of draining a gasoline line may be accomplished without waste of gasoline, without fire hazard, and without the manual labor of turning the motor upside down over the gasoline receptacle.

Further objects and advantages of the invention will become apparent from the following description and claims, and from the accompanying drawings, wherein:

Figure 6 is a vertical cross-sectional view taken through the male element of Figure 1.

Figure 7 is a vertical cross-sectional view taken through the female element of Figure 2.

Figure 8 is a vertical cross-sectional view taken through the connector unit with the male element of Figure 1 shown joined to the female element of Figure 2 to provide a fluid connection therebetween.

Figure 9 is a cross-sectional detail view taken on line 9—9 of Figure 6.

Figure 1:
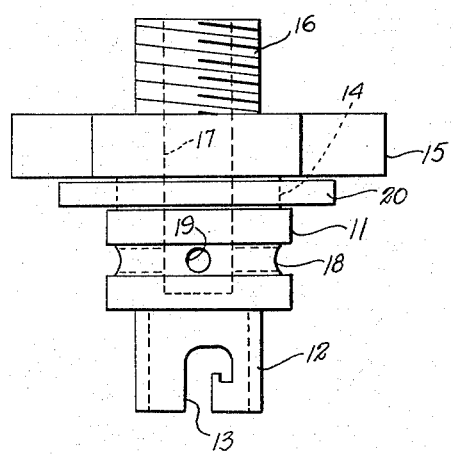
Figure 1 is an elevational view of the male element of a fluid line connector unit constructed in accordance with the present invention.
Figure 3:
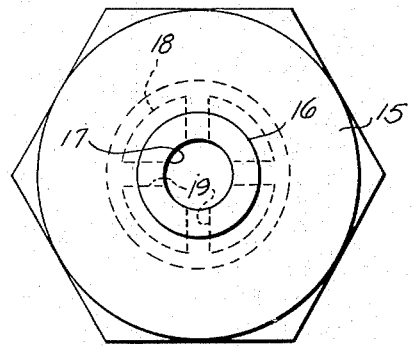
Figure 3 is a top plan view of the male element shown in Figure 1.

Referring to the drawings, and more particularly to Figures 1, 3, 6, and 9, the male element of the connector unit comprises a main body portion 11, which is generally cylindrical in cross-section and which terminates at one end in a reduced cylindrical sleeve element 12 formed with opposed bayonet slots 13, 13. Adjacent the other end of portion 11 is a reduced portion 14 and adjacent said portion 14 is an enlarged hexagonal flange 15. The male element terminates in a threaded nipple portion 16 which may be connected to the end of a fluid line. The male element is formed with an axial bore 17 extending through nipple 16, flange 15, portion 14, and terminating in body portion 11. Said body portion 11 is formed with a peripheral outer groove 18 and with radial passages 19 connecting groove 18 to the axial bore 17. A resilient sealing washer 20 of rubber or other suitable resilient gasket material is fitted on the portion 14.

Figure 2:
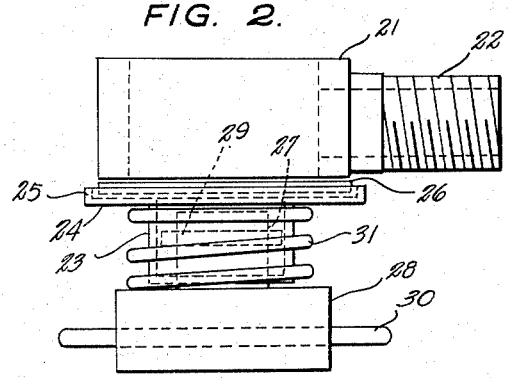
Figure 2 is a front elevational view of the female element of the fluid line connector unit.
Figure 4:
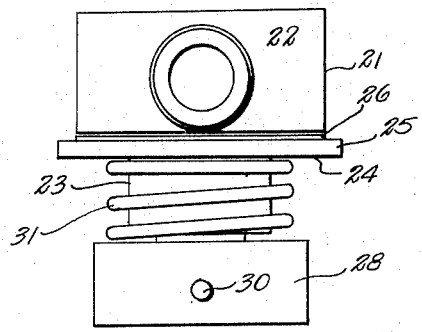
Figure 4 is a side elevational view of the female element of Figure 2.
Figure 5:
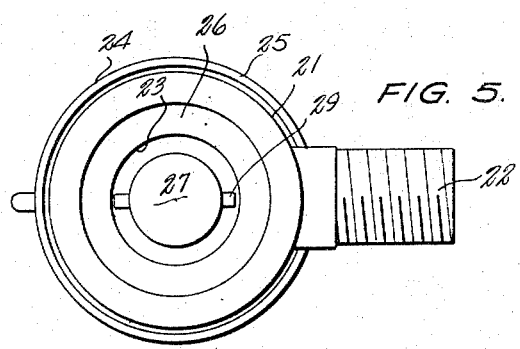
Figure 5 is a top plan view of the female element of Figure 2.

Referring now to Figures 2, 4, 5, and 7, the female element of the connector unit comprises a cylindrical ring member 21 formed with a threaded nipple element 22 projecting radially therefrom. Designated at 23 is a cylindrical shell member formed with a flange 24 having a peripheral annular flange 25 integral therewith. Seated in flange 24 is a resilient sealing washer 26 of rubber or other suitable resilient gasket material. Positioned axially in shell member 23 and axially slidable in an opening formed through the bottom wall thereof is a stud element 27 formed with an enlarged base portion 28. Secured transversely in stud element 27 and projecting from opposite sides of said stud element is a pin member 29 and secured transversely in base portion 28 and projecting from opposite sides of said base portion is another pin member 30. Encircling shell member 23 is a coiled spring 31 bearing at one end on flange 24 and at the other end on base portion 28.

In connecting the male element to the female element, the body portion 11 of the male element is introduced into ring member 21 of the female element, the sleeve member 12 being received in shell member 23 with the ends of pin 29 received in the bayonet slots 13, 13, as shown in Figure 8. The male element is locked to the female element by pushing base portion 28 inwardly and then rotating said base portion slightly relative to the remainder of the assembly, the male element being meanwhile held stationary. This lockingly engages the ends of pin member 29 in the bayonet hook portions of the bayonet slots 13, 13, the spring 31 exerting an outward axial thrust on base portion 28 to retain the ends of pin member 29 locked in the bayonet slot hook portions. Spring 31 also exerts axial thrust between base portion 28 and flange 24. The thrust on base portion 28 is transmitted through stud 27 and pin 29 to the male member, providing relative squeezing pressure between flange 15 and flange 24 which compresses the respective gaskets 20 and 25 against the top and bottom rims of the ring member 21 and thereby provides a fluid-tight joint between the male and female elements of the connector. Fluid may therefore flow through the passage defined by bore 17, passages 19 and the bore of nipple member 22.

The connector may be readily detached by reversing the above procedure.

Pin member 30 provides a firm handle grip for grasping base portion 28 during the connection or disconnection of the male and female elements.

The use of a connector unit such as above described in the line between the gasoline tank and motor of an outboard motor assembly greatly facilitates the drainage of the tank whenever required. Under these circumstances the female element is secured to the conduit from the tank and the male element is secured to the conduit leading to the motor. A similar male element is secured to the conduit leading to the drainage receptacle. To drain the tank it is merely necessary to disconnect the female element from the motor conduit male element and to connect the receptacle conduit male element to the female element in place of the motor conduit male element. The draining of the motor tank may thereby be accomplished rapidly, with little waste of gasoline, with a minimum of fire hazard, and without the necessity of turning the motor upside down over the drainage receptacle.

While a specific embodiment of a quick-detachable fluid line connector has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A detachable fluid line connector unit comprising a male member having a hollow body portion and provided at its forward end with a sleeve projecting axially from said body portion, said sleeve being formed with a plurality of bayonet slots, a flange on said male member rearwardly adjacent said body portion, a female member formed with a ring-like body element and a nipple member communicating with said ring-like element, the male member body portion being receivable in said ring-like element with said sleeve projecting outwardly thereof, a plug member insertable in said sleeve and formed with projections lockingly engageable with said bayonet slots, an annular gasket encircling said sleeve and sealingly engaging said ring-like element and said male member body portion, and spring means bearing between said plug and said annular gasket and exerting outward thrust on said plug, the male member body portion being formed with a passage through its wall at the portion thereof received in said ring-like element.

2. A detachable fluid line connector unit comprising a male member having a hollow body portion terminating at its rear end in a nipple, a flange on said body portion adjacent said nipple, a sleeve projecting axially from the forward end of said body portion, said sleeve being formed with a plurality of bayonet slots, a female member formed with a ring-like body element and a nipple communicating with said ring-like element, the male member body portion being receivable in said ring-like element with said sleeve projecting outwardly thereof, a headed plug insertable in said sleeve and formed with projections lockingly engageable with said bayonet slots, a shell member encircling said plug and receiving said sleeve, said shell member being formed at its rear end with a flange, and a coiled spring encircling said shell member and bearing between the shell flange and the plug head and exerting outward thrust on said plug, the male member body portion being formed with a passage through its wall at the portion thereof received in said ring-like element.

3. A detachable fluid line connector unit comprising a male member having a hollow body portion terminating at its rear end in a nipple, a flange on said body portion adjacent said nipple, a sleeve projecting axially from the forward end of said body portion, said sleeve being formed with a plurality of bayonet slots, a female member formed with a ring-like body element and a nipple communicating with said ring-like element, the male member body portion being receivable in said ring-like element with the sleeve projecting outwardly thereof, a headed plug insertable in said sleeve and formed with projections lockingly engageable with said bayonet slots, a shell encircling said plug and receiving said sleeve, said shell being formed with a rear flange, a coiled spring encircling said shell and bearing between the shell flange and the plug head and exerting outward thrust on said plug, and annular resilient gaskets between the respective flanges and respective rims of the ring-like element, the male member body portion being formed with an annular peripheral outer groove and a passage through its wall communicating with said groove at the portion thereof received in said ring-like element.

4. A detachable fluid line connector unit comprising a male member having a hollow body portion, a projection extending axially from the forward end of said body portion, a flange at the rear of said body portion, a female member formed with a ring-like body element and a nipple communicating with said ring-like element, the male member body portion being receivable in said ring-like element with said projection extending outwardly thereof, a locking member releasably interlocking with said projection, an annular gasket encircling said projection and sealingly engaging said ring-like element and said male member body portion, and spring means bearing between said locking member and said annular gasket and exerting outward thrust on said locking member, the male member body portion being formed with a passage through its wall at the portion thereof received in said ring-like element.

NED B. FARISH, Jr.
JAMES O. COX, Jr.

REFERENCES CITED

The following references are of record in the file of this patent:

UNITED STATES PATENTS

| Number | Name | Date |
|---|---|---|
| 1,178,999 | Fleming | Apr. 11, 1916 |
| 2,400,658 | Shepherd | May 21, 1946 |
| 2,421,228 | White | May 27, 1947 |
| 2,459,643 | Hartley | Jan. 18, 1949 |